Dec. 21, 1937.   A. R. WURTELE   2,102,662
INTERNAL COMBUSTION ENGINE
Filed Oct. 21, 1932   2 Sheets-Sheet 2
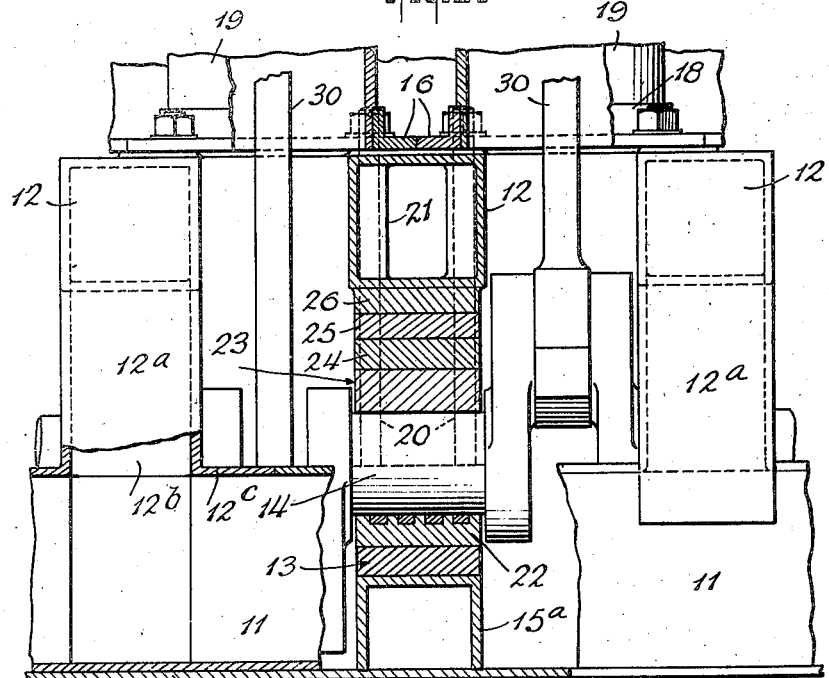
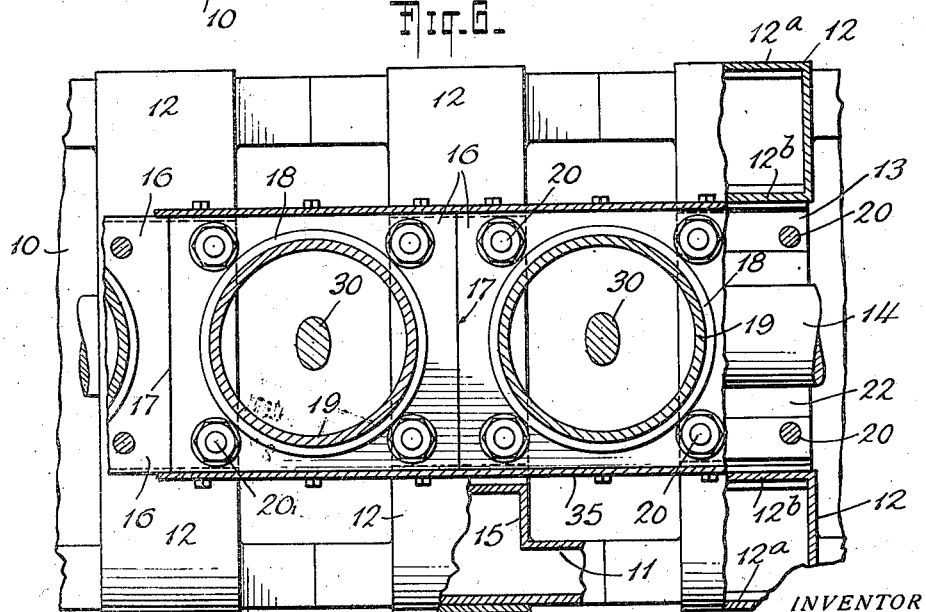
INVENTOR
Allan R. Wurtele
BY
F. Bascom Smith
ATTORNEY Patented Dec. 21, 1937

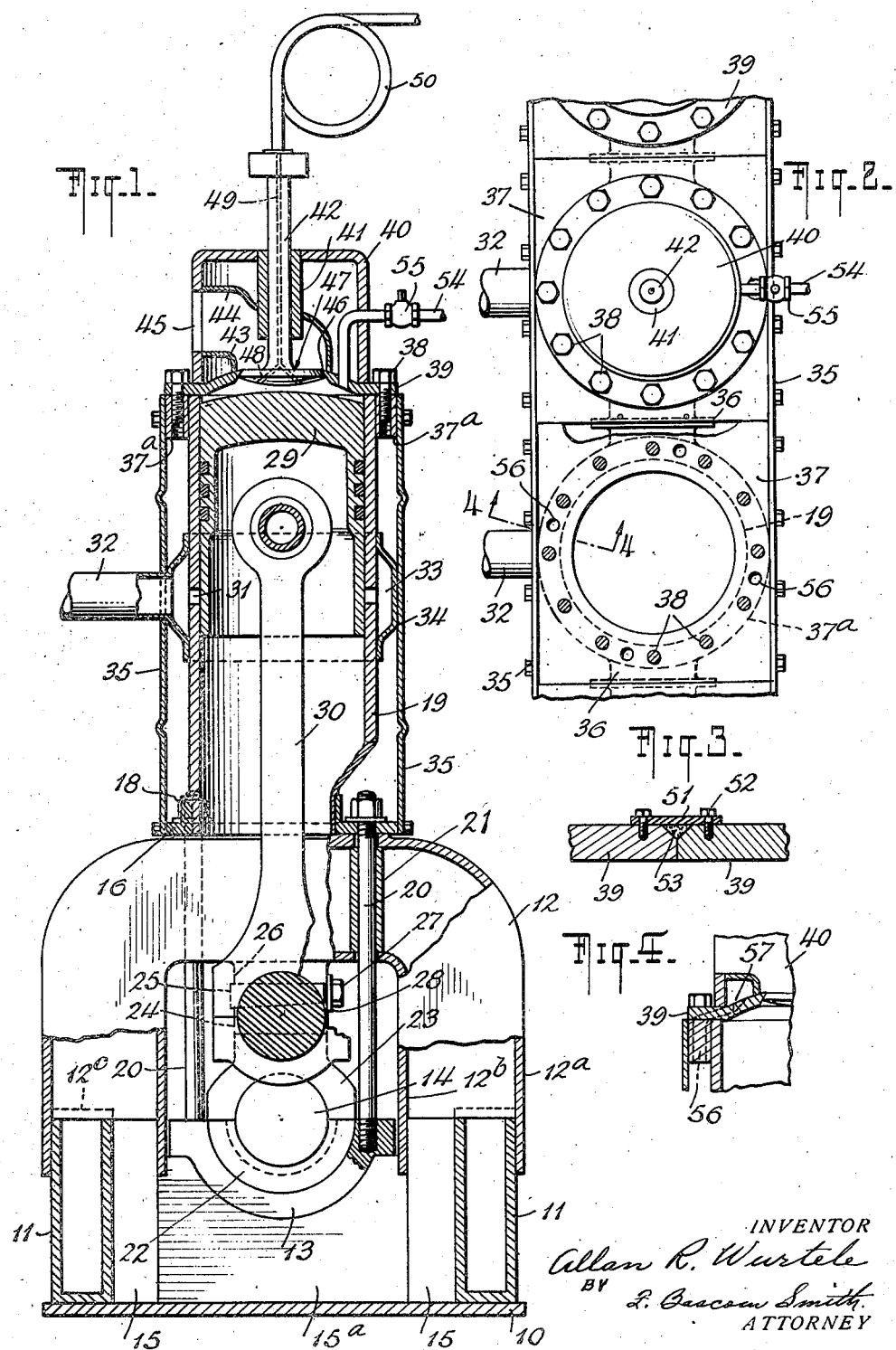

2,102,662

UNITED STATES PATENT OFFICE 2,102,662

INTERNAL COMBUSTION ENGINE

Allan R. Wurtele, New Roads, La.

Application October 21, 1932, Serial No. 638,852

7 Claims. (Cl. 123—195)

This invention relates to internal combustion engines, and more particularly to engines of the Diesel type.

The field of use of the Diesel type engine has been limited by its excessive weight and size, which latter has resulted primarily from the use of cast iron in the construction thereof. The low tensile strength of iron castings has made it necessary to employ large and heavy sections frequently supplemented by tension members. Such construction not only results in engines of excessive size, weight and cost but frequently results in structures so formed that castings which are subject to wide temperature ranges, such as the cylinders, cannot properly expand and contract without fracture or loosening of the parts.

One of the objects of the present invention, therefore, is to provide a novel Diesel engine so constructed that the size and weight per horse power, as well as the cost of manufacture, is greatly reduced.

Another object of the invention is to provide a novel engine of the Diesel type so constructed as to eliminate the necessity for frame castings, the structural elements of the engine frame being constituted by welded shapes and plates.

A further object is to provide a novel Diesel type engine employing the uni-flow principle of operation, i. e., wherein the scavenging and combustion supporting medium is admitted through a series of ports provided in the cylinder liner intermediate the ends thereof, the burning gases of combustion being exhausted through a poppet valve disposed centrally of the cylinder head.

Another object is to provide an internal combustion engine embodying a novel construction whereby the cylinders are free to expand and contract under heat changes independently of the novel frame and the novel anchoring means for the cylinders.

Another object is to provide a two-cycle Diesel engine of the port scavenging, valve-in-head exhausting type which is so constructed that the distance between the centers of adjacent cylinders is greatly reduced, thereby resulting in a shorter frame and a shorter crankshaft with consequent savings in weight, size and cost per horse power output.

Still another object is to provide a novel Diesel engine of the above character having central fuel injection and embodying a novel method of construction.

The above and other objects and advantages will appear more fully hereinafter in the detailed description of the invention which is to be considered with the accompanying drawings. It is to be expressly understood, however, that the drawings are for purposes of illustration only and are not designed as a definition of the limits of the invention, reference being had, primarily, for this purpose to the appended claims. In the drawings:

Fig. 1 is a transverse section, with parts broken away, of an engine embodying the invention;

Fig. 2 is a top view, half in plan and the lower half in section, with parts broken away, of two cylinders constructed in accordance with the invention;

Figs. 3 and 4 are enlarged sectional views of certain details of construction which may be employed;

Fig. 5 is a side elevation, partly in section and with parts broken away, showing details of the engine frame and the anchoring means for the cylinders; and Fig. 6 is a top view, partly in plan, partly in section, and with parts broken away, of the construction shown in Fig. 5.

Referring in detail to the drawings wherein like reference characters indicate like parts throughout the several views, the novel engine frame of the present invention comprsies a bed plate 10 having welded near the longitudinal edges thereof a pair of vertically-disposed girders 11, said girders having a U-shaped, transverse cross-section. Enlarged portions 15 of said girders are provided opposite each main bearing for the engine crankshaft 14. Preferably, members 11 are formed by welding together steel plates and/or shapes.

A plurality of arched girders which are (as shown) substantially square in cross-section constitute transversely extending frame members that are welded at their lower extremities to the enlarged portions of longitudinal members 11, a transverse girder being thereby provided in the vertical plane of each main bearing. As shown, the outer and inner plates 12a and 12b, respectively, of each transverse member 12 project downwardly a short distance below the upper surface of girders 11, and these extending portions are welded to the adjacent lateral faces of said girders. The side plates of member 12 have laterally extending lips 12c which are welded to, and serve to cover, girders 11.

In the illustrated embodiment, the main bearings, one of which is placed in the vertical plane of each girder 12, are constituted by semi-circular bearing shells 13 lined with a suitable bearing material. The shells fit into, and are supported by, the upper concave surface of a box-like supporting member 15a, the latter preferably consisting of a plurality of steel plates welded to one another and to the base plate 10.

The laterally spaced, transverse girders 12 carry on the upper surface thereof a longitudinally extending top plate which is preferably formed by welding together the abutting edges 17 (Fig. 6) of a plurality of rectangular plates 16. Each plate 16 constitutes the bottom flange of a cylinder and, for this purpose, it is provided with an up-standing, centrally disposed circular flange 18 surrounding and adapted to be welded to a cylinder liner 19 which is preferably formed as a forging having the inner surface thereof hardened to increase its wearing qualities.

The frame member constituted by the plates 16 may be welded to the upper surface of the transverse girders 12 but, preferably, each plate 16 is rigidly held in place by means of bolts 20 which extend through suitable openings provided adjacent the corners of said plates, said bolts passing downwardly through openings in girder 12 and having threaded engagement at their lower end with the bearing shell 13. Spacing sleeves constituted by bent plates 21 may be provided within the hollow girders 12 for the bolts 20, said sleeves being welded to the side plates of girder 12. The lower half of bearing 22 is thus supported by shell 13 and bolts 20 while the upper half 23 of the journal bearing, in the form shown, is held in place by means of wedges 24 and 25 interposed between said bearing half 23 and a suitable projection 26 welded to the lower surface of transverse girder 12. Preferably, wedges 24 and 25 are adjusted and held in adjusted position by means of a bolt 27 threaded into the upper wedge 25 and a washer 28 which engages the side of projection 26 and the end of wedge 24.

It will be noted that bolts 20 hold the cylinders in operative position on the engine frame without restraining the cylinder liners against expansion. These bolts, which with bearing shell 13 constitute a strap, transmit the forces generated by the burning of the fuel in the cylinder around the engine crankshaft, and through wedges 24 and 25 to the engine frame.

Mounted to reciprocate within the liner 19 is a suitable piston 29 carrying any suitable number of piston rings and operatively connected with the crankshaft 14 by means of a connecting rod 30. It will be noted that space is provided in the lower portion of the engine frame for the movement of the lower end of the connecting rod between reduced portions of the longitudinal members 11.

The engine shown is of the uni-flow type, the scavenging and combustion supporting fluid being introduced into the cylinder through ports 31 formed in liner 19. In order to impart a swirling motion to the air, ports 31 may be tangentially disposed rather than radially. Air under pressure from a suitable tank or compressor (not shown) is supplied to the ports 31 by means of a conduit 32 which discharges into an annular air duct 33, the walls of said duct being formed by the outer wall of liner 19 and an annular member 34 which is welded to the liner. The annular member 34 thus serves to strengthen the liner, compensating for the weakening effect of ports 31.

As will be seen more clearly in Fig. 2, the annular air ducts of adjacent cylinders are connected intermediate the cylinders as by means of a flange connection 36 whereby two or more supply ducts may serve to supply a single cylinder. The diameter of these ducts can accordingly be reduced without loss of the desired capacity, and the overall length of the engine is materially shortened by disposing the air boxes or ducts in this manner, thereby reducing the crankshaft length and decreasing the size, cost and weight of the engine.

A novel cylinder head construction is employed in the present invention, said head being constructed and mounted in such a manner as to be removable and so that all thrusts thereon are transmitted through the liner and strap to the engine frame without hindering the freedom of contraction and expansion of the cylinder liners. As shown, a rectangular plate 37 having a central opening provided with a depending flange 37a for receiving the upper end of a cylinder liner, is welded to each of said liners. The abutting ends of plates 37 are preferably welded together and the continuous member so formed serves as the top member of the water jacket to be hereinafter described. The cylinder head proper is preferably built up of plates and shapes welded together and includes an inverted cup-shaped member 40 which is welded at its lower edges to the upper surface of an annular plate 39, the latter being removably secured by suitable means such as stud bolts to the upper surface of plate 37. Centrally disposed within the cup member 40, and extending downwardly therein, is a sleeve 41 constituting a guide for a valve stem 42. An irregularly shaped tubular member 43, 44 (Fig. 1) is welded to the inner surfaces of member 40, the lower end of said tube surrounding a central aperture in plate 39, and the upper end thereof to an inner wall of member 40 surrounding an aperture 45 in the latter. The tubular member 43, 44, is also provided with an opening through which extends the lower end of sleeve 41, said sleeve constituting the closure for said opening. Member 43, 44 thus constitutes the passage for the exhaust gases. Plate 39 is preferably arched upwardly toward the central opening therein to insure a smooth flow of exhaust gases, a seat 46 being provided by the walls of said opening for a valve 47. Suitable passages 48 and 49 are provided in the valve and valve stem in order that fuel may be introduced into the cylinder by suitable injecting mechanism (not shown). The fuel supply means includes a flexible conduit 50 to permit reciprocation of valve 47. Any suitable operating means (not shown) may be employed for reciprocating said valve.

If desired, the rectangular plates 37 may be secured together at their abutting edges by means of a plate 51 and studs 52 which are readily removable to permit disassembly. Packing 53 may be inserted in the seam formed by the abutting edges of plates 39, the packing being held in place by plate 51 to insure water tightness of the joint. Preferably, however, plates 37 are welded together as noted above.

The engine is provided with suitable starting means which constitutes no part of the present invention, it only being necessary to point out that said means includes a conduit 54 extending through the cylinder head for introducing compressed air into the cylinder, said conduit being fitted with a relief valve 55.

As will be seen more clearly in Fig. 2, the water jacket plates 35 are rectangular and may be continuous throughout the length of the engine, and communication between the cooling space in the cylinder head and the main water jacket cooling space is provided by means of passages 56 in member 37, 37a and a suitable number of passages 57 (Fig. 4) in register therewith, the passages 57 being drilled in the pressure plate 39. The upper and lower edges of the water jacket plates 35 may be welded or bolted to the longitudinal edges of the plates 37 and the cylinder flanges 16, respectively. A water jacket common to all cylinders is thereby provided, the plates 35 forming the side walls and plates 16 and 37 the lower and upper closures thereof, respectively.

There is thus provided a novel internal combustion engine of the two-cycle, port scavenging, valve-in-head exhausting type, which is so constructed that the necessity for large and heavy castings is eliminated. Vertical forces exerted on the cylinder head are transmitted through the liner and the strap of which the main bearing forms a part to the engine frame while at the same time the cylinder liners are at all times free to expand and contract. The use of air boxes 33, 34 enables a shorter crankshaft to be employed and the welded engine frame materially reduces weight, size and cost of construction. Wedges 24, 25, together with bolts 20, permit of adjustment of the bearings, said wedges also serving to hold the crankshaft against upward movement. Attention is called to the fact that the water cooling is such that the holding-down bolts for the cylinder head are cooled, thereby preventing expansion and consequent loosening of said bolts under changing temperatures.

Although the one embodiment of the invention illustrated and described by way of example is in the form of a single acting, Diesel type engine, it is to be expressly understood that the same is not limited thereto but that the same is applicable to other types of engines. Various other changes may be made in the details of construction and arrangement of parts illustrated as will be understood by those skilled in the art, and reference will, accordingly, be had, primarily, to the appended claims for a definition of the limits of the invention.

What is claimed is:

1. In an internal combustion engine, a frame including a plurality of arched members, a plurality of cylinders each having flange means thereon, said flange means being adapted to rest on said arched members, and means including a plurality of tie bolts operatively engaging said flange means and extending beneath an arched member for maintaining said cylinder in place.

2. In an internal combustion engine, a frame including a plurality of arched girders in spaced relation and a transverse girder joining the vertical portions of each of said arched girders, a bearing supported by each of said transverse girders, a shaft journaled in said bearings, a bearing cap for each of said bearings, and means interposed between each of said bearing caps and said arched girders for holding said caps in engagement with said bearings.

3. In an internal combustion engine, a frame including a pair of longitudinal girders, a plurality of arched girders in spaced relation and spanning said longitudinal girders, and transverse girders in the same vertical planes with said arched girders, shaft bearings supported by said transverse girders, bearing caps therefor, means interposed between said caps and arched girders for maintaining said caps in operative position, a plurality of cylinders rigidly secured to a common plate mounted on said arched girders, and means extending through the latter for anchoring said plate and cylinders to said bearings.

4. In an internal combustion engine, a frame, a plurality of cylinders, flanges on said cylinders for supporting the latter on said frame, a second flange on each of said cylinders adjacent the upper end thereof, abutting edges of said flanges being joined to form a unitary structure, and means secured to said flanges to form a common water jacket for a plurality of said cylinders.

5. In an internal combustion engine, a frame, a plurality of cylinders, flanges on said cylinders for supporting the latter on said frame, a second flange on each of said cylinders adjacent the upper end thereof, abutting edges of said flanges being joined to form a unitary structure, and means engaging said first named flanges for removably securing said unitary structure to said frame.

6. In an internal combustion engine, a frame having an arched portion, a crankshaft, a bearing comprising a portion supported by said frame for rotatably supporting said crankshaft and a bearing cover engaging the upper portion of the crankshaft, a cylinder supported on said frame, connecting means between said cylinder and said first-named bearing portion, and removable means interposed between said bearing cover and the arched portion of said frame for preventing upward movement of the former relative to the latter.

7. In an internal combustion engine, a frame having an arched portion, a bearing supported by said frame, a shaft journalled in said bearing, a bearing cap engaging the upper portion of said shaft, and removable means interposed between the upper surface of said bearing cap and said arched portion of the frame for maintaining said bearing cap in operative position.

ALLAN R. WURTELE.